(No Model.)

G. B. SNOW.
GAS REGULATING APPARATUS FOR VULCANIZERS.

No. 506,742. Patented Oct. 17, 1893.

Witnesses
Edwin R. Davis
Leonard B. Perry

Inventor:
George B. Snow

UNITED STATES PATENT OFFICE.

GEORGE B. SNOW, OF BUFFALO, NEW YORK.

GAS-REGULATING APPARATUS FOR VULCANIZERS.

SPECIFICATION forming part of Letters Patent No. 506,742, dated October 17, 1893.

Application filed December 10, 1892. Serial No. 454,793. (No model.)

*To all whom it may concern:*

Be it known that I, GEORGE B. SNOW, of the city of Buffalo, in the county of Erie and State of New York, have invented certain new and useful Improvements in Gas-Regulating Apparatus for Vulcanizers, of which the following is a specification.

This invention relates to apparatus employed in connection with vulcanizers, by means of which the flow of gas used to heat the same is controlled, so that the temperature of the vulcanizer shall not be allowed to exceed a certain predetermined point, dispensing with any supervision from the person in charge.

Its object is to provide means whereby the apparatus may be adjusted before the vulcanizing process has been commenced, and the temperature of the vulcanizer held at any desired point, avoiding the outlay of time which has heretofore been required to watch the vulcanizer until the desired temperature was attained.

Its object is also to produce an apparatus of such form that the nozzles to which rubber tubes are attached for the purpose of conducting gas thereto and therefrom shall be horizontal or drooping, thus avoiding any tendency of the tubing to fall over and collapse, thereby impeding or arresting the flow of the gas.

It consists in the construction and arrangement of parts which will be hereinafter more particularly specified.

Figure 3:
Figure 1:
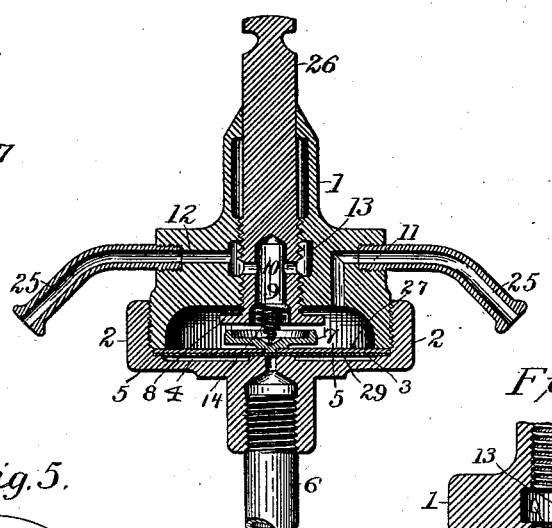
Figure 2:
Figure 5:
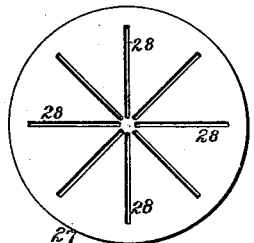
Figure 4:
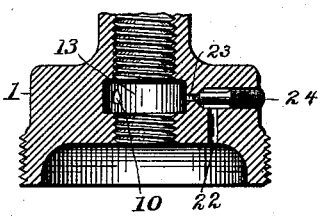
Figure 6:
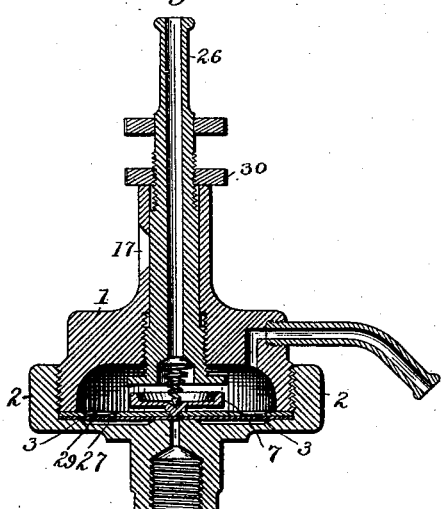
Figure 7:

In the accompanying drawings, Figure 1. is a vertical central section of a gas regulator which embodies the principles of my invention. Fig. 2. is an elevation of the upper part of the regulator shown in Fig. 1., showing an index, by means of which it may be adjusted to operate at the desired temperature and pressure. Fig. 3. shows an alternative construction of the index. Fig. 4. is a vertical section of the same regulator shown in Fig. 1., but on a different plane; showing the bypass and the supplementary gas chamber. Fig. 5. is a plan of the spring brass reinforcing plate which I employ in connection with my flexible diaphragm. Figs. 6 and 7 represent one manner of applying an index to an old and well-known form of regulator, in which one of the gas passages extends centrally through the adjusting screw.

Gas regulators of a somewhat similar construction to mine have been made heretofore, but one of the gas passages has been formed by drilling a central hole through the extension 26 [see Fig. 6], and forming it suitably for the attachment of rubber tubing. This has placed upon this part of the regulator the performance of two functions, viz: the conduction of gas by means of the rubber tubing attached, and the adjustment of the device for operation at the desired steam pressure. The adjustment of the regulator, under these circumstances, has been found to be inconvenient.

Furthermore, in gas regulators heretofore constructed as described, no index has been provided, by means of which adjustment could be easily and quickly performed; and it has been customary when their adjustment was necessary or desirable, to first heat the vulcanizer until the steam-gage or thermometer attached thereto indicated the desired pressure or temperature, and then move the adjusting screw of the regulator until the gas flame by which the vulcanizer was heated was reduced to a size just sufficient to maintain the heat already attained. This required a considerable expenditure of time, which, with my improved regulator, is entirely unnecessary. From the vertical direction of the extension 26, there has been danger of the rubber tube connected thereto collapsing and impeding the flow of gas; a difficulty which I avoid.

The body of the regulator is made in two parts, 1 and 2, which may be either bolted or screwed together. Between them is held the flexible diaphragm 3, with which they form a steam tight joint. The cavity within the casing is thus divided into two parts; a steam chamber, 4, and a gas chamber, 5. The steam pipe 6 conducts steam to the steam chamber, and serves as a means of attachment of the regulator to the vulcanizer. A valve, 7, is placed in the gas chamber, resting centrally upon the diaphragm 3. It is evident that when the diaphragm yields to the pressure of steam in the steam chamber 4, the valve 7 will be raised, and will come in contact with the valve seat 8, if the pressure is sufficient. In order to make the apparatus adjustable for different pressures, the valve seat 8 is provided with a threaded extension 26, by means of which it may be screwed up or down, and adjusted at the proper distance from the valve 7. A central hole 9 is drilled in the valve seat 8, with cross holes 10, which register with a supplementary gas chamber 13, which is shown in the drawings as formed by turning out a portion of the female thread in the part 1, with which the thread upon the extension 26 engages. It might be formed by turning a groove in the extension 26, which in either case may have a threaded fit on one side of the chamber 13, and a plain turned fit on the other. Or the bearing surface next the valve may be enlarged in diameter, converting the groove 13 into a rabbet. The effect would be the same, as there would be in either case a supplementary gas chamber, communicating with the main gas chamber 5 only through the passages 9, 10, through which the gas could find its exit, whether the valve 7 and its extension 26 were screwed up or down. A gas inlet 11, and a gas outlet 12 are provided; one leading into the gas chamber 5, the other from the gas chamber 13. Suitable nozzles 25 are screwed into the passages 11 and 12, and rubber tubing is attached thereto when it is desired to conduct gas to and from the apparatus. By this arrangement, the extension 26 is relieved from serving as a gas conductor, as has heretofore been the case, and has but one function; the adjustment of the valve seat 8. Both gas connections are horizontal, and may be made to droop, if desired; and any tendency to collapse on the part of the rubber tubes is thus entirely avoided. A light spiral spring 14 is placed between the valve 7 and its seat 8, and holds the valve in contact with the diaphragm 3, thus insuring its separation from its seat when the diaphragm recedes.

A regulator constructed as described above is capable of adjustment for different pressures or temperatures; but in order to adjust it, it is necessary to heat the vulcanizer to which it is attached to the desired pressure or temperature as shown by the steam gage or thermometer attached thereto, and if a change is desired, the same process must be repeated.

To enable the adjustment to be made at any time, and almost instantaneously, I employ an index, which is described as follows: The upper part of the section 1 of the casing is chamfered to an edge, and through its central hole projects the extension 26. Upon the chamfered portion of 1 are made suitable radiating graduations, 15, and upon the side of 26 a vertical line 16 with one or more horizontal ordinates, corresponding with the thread on 26 as to pitch. The graduations 15 being numbered, the positions of the extension 26 for certain pressures are ascertained, and it can then be re-adjusted for any one of them in an instant, and without having further recourse to the gage or thermometer on the vulcanizer.

Another form of index is shown in Fig. 3, in which the extension 26 is supposed to be threaded so that one turn will cover the entire movement of the valve seat 8. Suitable figures being properly disposed upon its side, they will appear in rotation at the peephole 17, formed in the upper part of section 1 of the casing, and thus indicate the pressure or temperature at which the regulator will hold the vulcanizer. In Figs. 6 and 7, this last described form of index is shown as applied to an old and well-known form of regulator. The only points different from what have been already described are the extension of the central gas passage 9 entirely through extension 26, and the extra thread and jam-nut 30 by which the parts are secured when adjusted. Both of these features are old, and need no further explanation.

The flask containing the plate to be vulcanized being placed in the vulcanizer with a sufficient quantity of water, it is then closed, and the regulator connected with the gas main and the burner under the vulcanizer by means of rubber tubing. The gas is then lighted, and when the vulcanizer becomes hot, the steam pressure generated therein will bulge the diaphragm 3, and cause the valve 7 to rise and approach its seat. By turning the adjusting screw 26 when the thermometer or steam gage attached to the vulcanizer shows the desired heat or pressure, the movable valve seat 8 is made to meet the valve 7, and check the flow of gas, thus preventing the vulcanizer from being overheated. After the valve seat 8 is thus adjusted, any number of subsequent vulcanizations may be performed at the same pressure or temperature, the vulcanizer requiring no further care from the operator than to see that it is closed steam-tight, and the gas under it lighted. But if a different vulcanizing temperature is required, as is often the case, it becomes necessary for the operator to again watch the vulcanizer until it attains the desired temperature before he can readjust the regulator. The application of the index, however, renders it practicable to set the valve seat 8 at any time, even before the gas is lighted under the vulcanizer; it being only necessary to turn the adjusting screw 26 until the figures denoting the desired temperature or pressure, as the case may be, are shown by the index. After the gas is lighted under the vulcanizer, the dentist need then give it no further supervision until vulcanization is complete, and the time comes for extinguishing the gas, and by using a timing mechanism for this purpose, he may be relieved from even this care.

I do not confine myself to the precise forms of index shown, and described herein, as there are numerous other forms thereof which will readily occur to any one of any mechanical ability, which are applicable to the forms of gas regulator in question.

The above described devices comprise all the parts necessary for controlling the gas supply, and regulating the steam pressure of the vulcanizer. For the preclusion of any danger of the flow of gas being entirely cut off and the flame extinguished, I also provide an adjustable by-pass, which consists of the passages 22 and 23, and the pointed screw 24, by which they may be partially or entirely closed, and whereby enough gas may be allowed to pass to the burner to keep it alight.

Any diaphragm having sufficient flexibility, elasticity and strength can be used in the construction of my regulator, but I prefer the one shown in Fig. 5. A circular plate of spring metal, preferably brass, 27 of uniform thickness, and of such diameter as to be held firmly between the sections 1 and 2 of the casing, is pierced with a series of saw-cuts 28, dividing it radially into a series of stiff springs. This is superimposed upon a circular imperforate plate of thin copper 29, of the same diameter. The latter forms a steam tight diaphragm, and the brass plate gives the requisite elasticity and strength.

Having thus fully described my invention, I claim as follows:

1. A gas regulator for controlling the flow of gas used for heating a vulcanizer; consisting essentially of a hollow casing provided with suitable inlet and outlet passages, a flexible diaphragm, dividing the cavity within the casing into a steam chamber and a gas chamber, a valve located centrally upon the gas side of the diaphragm, a movable valve seat having gas passages registering with a supplementary gas chamber, and an adjusting screw for causing the valve seat to approach or recede from the valve; substantially as described.

2. A gas regulator for controlling the flow of gas used for heating a vulcanizer; consisting essentially of a hollow casing provided with suitable inlet and outlet passages, a flexible diaphragm, dividing the cavity within the casing into a steam chamber and a gas chamber, a valve located centrally upon the gas side of the diaphragm, a movable valve seat, an adjusting screw for causing the valve seat to approach or recede from the valve, and an index; substantially as described.

3. A gas regulator for controlling the flow of gas used for heating a vulcanizer; consisting essentially of a hollow casing provided with suitable inlet and outlet passages, a flexible diaphragm, dividing the cavity within the casing into a steam chamber and a gas chamber, a valve located centrally upon the gas side of the diaphragm, a movable valve seat having passages registering with a supplementary gas chamber, an adjusting screw for causing the valve seat to approach or recede from the valve, and an index; substantially as described.

GEORGE B. SNOW.

Witnesses:
THOS. A. RUSSELL,
CHARLES E. CLARK.